United States Patent
Stooker et al.

(10) Patent No.: US 9,615,591 B1
(45) Date of Patent: Apr. 11, 2017

(54) MEAT STRIPPER WITH ARTICULATING STRIPPER PLATE ASSEMBLY

(71) Applicant: Foodmate, B.V., Oud-Beijerland (NL)

(72) Inventors: Dirk Cornelis Stooker, Oud-Beijerland (NL); Jacobus Eliza Hazenbroek, Oud-Beijerland (NL)

(73) Assignee: Foodmate B.V. (NL)

( * ) Notice: Subject to any disclaimer, the term of this patent is extended or adjusted under 35 U.S.C. 154(b) by 0 days.

(21) Appl. No.: 14/947,762

(22) Filed: Nov. 20, 2015

(51) Int. Cl.
*A22C 17/00* (2006.01)
*A22C 17/04* (2006.01)
*A22C 17/02* (2006.01)
*A22B 5/00* (2006.01)
*A22C 21/00* (2006.01)

(52) U.S. Cl.
CPC .......... *A22C 17/004* (2013.01); *A22B 5/0035* (2013.01); *A22C 17/02* (2013.01); *A22C 17/04* (2013.01); *A22C 21/0069* (2013.01)

(58) Field of Classification Search
CPC . A22C 21/0076; A22C 17/02; A22C 21/0069; A22B 5/0017; A22B 5/0029
USPC .......................... 452/135, 136, 138, 125, 127
See application file for complete search history.

(56) References Cited

U.S. PATENT DOCUMENTS

| | | | | |
|---|---|---|---|---|
| 5,203,736 A | * | 4/1993 | Schulte .............. | A22C 21/0076 452/127 |
| 5,401,210 A | * | 3/1995 | Manmoto .......... | A22C 21/0076 452/127 |
| 5,713,787 A | * | 2/1998 | Schoenmakers ..... | A22C 17/004 452/136 |
| 5,961,383 A | * | 10/1999 | Janssen .............. | A22C 21/0076 452/135 |
| 5,976,004 A | * | 11/1999 | Hazenbroek ....... | A22C 21/0084 452/136 |

* cited by examiner

*Primary Examiner* — Richard Price, Jr.
(74) *Attorney, Agent, or Firm* — Womble Carlyle Sandridge & Rice LLP (57) ABSTRACT

A meat stripper is disclosed for stripping meat from the bone of an animal part. The meat stripper includes a slide block and a first stripper plate assembly including an arm pivotally mounted to the slide block and having a first stripper plate at an opposite end. A second stripper plate assembly including an arm is pivotally mounted to the slide block and has a second stripper plate at an opposite end with the second stripper plate opposing the first stripper plate. The first and second stripper plates move away from each other to open the meat stripper when the arms are pivoted apart and move toward each other to surround the bone when the arms are pivoted together. A mechanism is disclosed for moving the stripper plates along the length of the bone to strip meat from the bone. A mechanism also is disclosed for articulating at least one of the stripper plates after meat has been stripped from the bone in such a way that meat lodged in or on the stripper is dislodged and falls to a collection location below. In one example, the pivot plate pivots to dislodge the meat and is magnetically biased to a stripping position.

21 Claims, 9 Drawing Sheets

MEAT STRIPPER WITH ARTICULATING STRIPPER PLATE ASSEMBLY

TECHNICAL FIELD

This invention relates generally to automated meat processing equipment and more specifically to equipment for stripping and collecting meat from an animal extremity and, in one exemplary embodiment, stripping and collecting meat from poultry thighs.

BACKGROUND

The ability to obtain large quantities of thigh meat from slaughtered animals such as poultry or fowl by automated mechanical means is of great importance to world food production. It is not uncommon in the food industry, for instance, that well over a hundred thousand slaughtered birds are processed in one day's shift at a poultry processing plant to obtain meat for public consumption. One common operation in poultry processing plants is the removal of meat from thigh bones of poultry for packaging or further processing.

Various methods and machinery have been developed for the automated removal of thigh meat from thigh bones (femurs) of poultry and fowl as thighs are moved along a processing path. U.S. Pat. No. 8,882,571, for example, discloses a method and apparatus for collecting meat from poultry thighs. The method of the '571 patent involves grasping a thigh bone of an animal thigh at its hip knuckle with a bone holder, cutting the tissue near the hip knuckle, grasping the thigh bone adjacent the hip knuckle between opposing jaws of a meat stripper, and moving the bone holder and meat stripper away from one another to strip the thigh meat from the thigh bone. The '571 patent is hereby incorporated by reference in its entirety.

While methods and machines such as those disclosed in the incorporated '571 patent have widely been considered successful, one nagging problem has remained. Under some circumstances, the meat stripped from the thigh bone as the stripper and bone holder are moved away from one another gets stuck or lodged in or on the stripper plates of the meat stripper and does not readily fall under the influence of gravity to a collection location below. This, in turn, can cause malfunctions or require additional personnel to monitor the operation and remove the thigh meat manually when it lodges in a meat stripper. While this problem has not been very prevalent in many countries of the world, it has proven to be particularly vexing in poultry processing plants located in the United States. This is because the sizes of chickens processed in the U.S. and thus the sizes of their thighs can be significantly larger and meatier than chickens processed in countries other than the U.S.

Accordingly, there is a need for an improved method and apparatus for deboning animal thighs that addresses the problems and shortcomings discussed above and more specifically that eliminates the lodging of meat in or on the stripper plates of a meat stripper. In a more general sense there is a need to overcome or ameliorate at least one of the disadvantages of the prior art. There is an overall need to provide alternative structures that are less cumbersome in assembly and operation and that moreover can be made relatively inexpensively. Alternatively a need exists at least to provide consumers of poultry processing machinery with a useful choice. It is to the provision of a method and apparatus that meets these and other needs that the present invention is primarily directed.

SUMMARY

Briefly described, an apparatus is disclosed for separating and collecting meat from animal parts where each animal part has meat surrounding a bone with a first knuckle at one end of the bone and a second knuckle at an opposite end of the bone. The apparatus includes a conveyor defining and moving along a processing path and a plurality of bone holders coupled to the conveyor in spaced relationship and movable with the conveyor along the processing path. Each bone holder is configured to receive and hold the bone of an animal part from the first knuckle of the bone to suspend the animal part from the bone holder.

A meat stripper station is disposed along the processing path for stripping the meat from animal bones conveyed through or around the stripper station. The meat stripper station includes a plurality of meat strippers each having a first stripper plate and a second stripper plate selectively movable toward and away from one another. Each meat stripper preferably is moved along the processing path synchronously with and below one of the plurality of bone holders. A mechanism is provided for moving the first and second stripper plates apart to open the meat stripper, moving the meat stripper upwardly to align the stripper plates with the bone just below the bone holder, and moving the stripper plates together to engage and substantially the bone. A mechanism also is provided for moving the meat stripper and the bone holder progressively away from one another to strip the meat progressively from the bone in a direction toward the second knuckle. This mechanism further moves the meat stripper over the second knuckle to separate the meat from the bone.

A further mechanism is provided for articulating at least one of the stripper plates of the meat stripper in such a way that meat lodged in or on the meat stripper plates is dislodged and dropped from the meat stripper to a collection location below. In one embodiment, the mechanism for articulating at least one of the stripper plates includes a pivot shaft rotatably journaled in a pivot block with the stripper plate mounted to a protruding end of the pivot shaft. A cam leaver is attached to an opposite protruding end of the pivot shaft. In operation, the cam lever engages a cam, which pivots the cam lever thereby rotating the pivot shaft to pivot the pivot plate downwardly. As a result, meat lodged in or on the pivot plates is dislodging and dropped to a collection location below. The pivot plate is then returned to its normal stripping position by a biasing mechanism that preferably includes magnets in the pivot shaft and pivot block that urge the pivot shaft and pivot plate to the stripping position with interacting magnetic forces.

It will thus be seen that an improved method and apparatus is provided that addresses and solves the above discussed and other problems and shortcoming inherent in the prior art. The invention will be better understood upon review of the detailed description set forth below when taken in conjunction with the accompanying figures, which are briefly described as follows.

DETAILED DESCRIPTION

Figure 1:
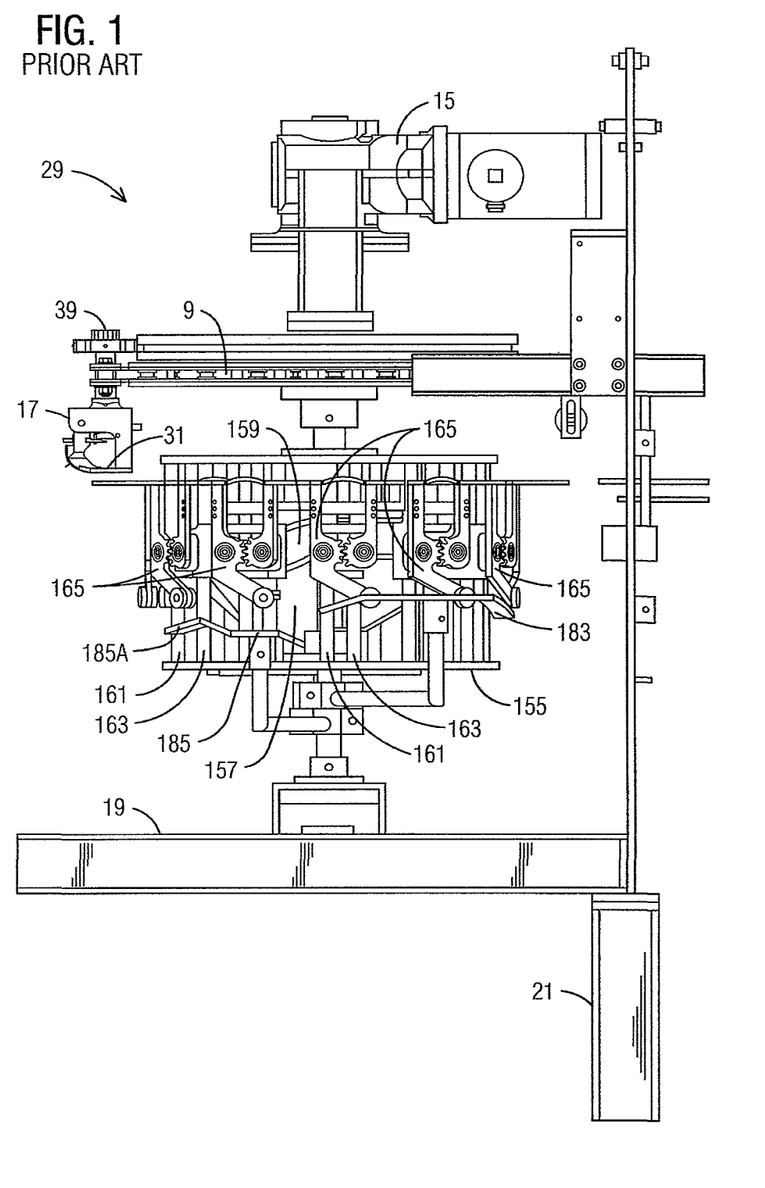
FIG. 1 is a partial side elevation of a prior art meat stripping and discharge section of a poultry processing machine where thigh meat is stripped from thigh bones.

Reference will now be made in more detail to the drawing figures, which illustrate one exemplary embodiment of the invention disclosed herein. In FIG. 1, a partial side elevation is shown of a typical prior art stripping and discharge section 29 of a poultry processing or cut-up line. The meat stripping and discharge section 29 includes a disc-shaped carousel 9 around which a conveyor chain and bone holders 17 attached to the conveyor (only one of which is shown in FIG. 1) move. In operation, a poultry thigh would previously have been inserted into each bone holder and each thigh would be suspended from its bone holder by a knuckle at one end of the thigh. The carousel 9 is driven by an electric drive motor 15 and rotates together with a cage 155, which also is driven by the electric drive motor 15 such that the cage 155 rotates in synchronization with the carousel 9.

The cage 155 rotates around a stationary cam drum 157, which is provided with one or more cam tracks 159. The rotating cage 155 includes a plurality of pairs of vertical slide bars 161, 163 to which a plurality of meat stripper units 165 are vertically slidably attached. Each of the meat stripper units 165 moves in synchronization with and directly beneath a corresponding one of the bone holders 17 moving around the carousel 9. Cam followers on the backs of the meat strippers ride in a cam track to move the meat strippers toward and away from corresponding bone holders above. The meat strippers 165 function to remove the meat from the bone of poultry thighs suspended from the bone holders above them by opening, moving upward around a thigh, closing, and then moving away from the bone holder, as described in more detail below.

The prior art meat stripper will now be further explained with reference to FIG. 2. Each meat stripper 165 has a sliding block 167, with a pair of vertically extending bores 169 (only one of which is visible in FIG. 14), for accommodating the pair of slide bars 161, 163 of the rotating cage 155. The slide block 167 is thus vertically slidable along the lengths of the slide bars. At the rear of slide block 167 there is provided a cam follower in the form of roller 171 that, in use, engages within the cam track 159 of the stationary cam drum 157. The cam track 159 is configured to move the sliding block and thus the meat stripper unit upwardly and downwardly in a predetermined timed pattern. For example, the cam track 159 may be configured to move the meat stripper upwardly to engage a poultry thigh hanging from the bone holder above and then downwardly to strip meat from the bone of the poultry thigh.

At the front of the sliding block 167 are positioned a first pivotable gripper arm 173 and a second pivotable gripper arm 175. The first and second pivotable gripper arms engage one another through gear toothed segments 173A, 175A. stripper plates 173B and 175B are disposed at the upper ends of gripper arms 173 and 175 respectively. The gear toothed segments 173A, 175A cooperate such that the gripper arms 173, 175 and respective and stripper plates 173B, 175B are synchronized to move apart away from the closed position shown in FIG. 2 by equal amounts relative to a center line between the plates. The stripper plates 173B, 175B are yieldably urged toward the closed centered position by a tension spring 177 or by another suitable spring or biasing arrangement.

The second gripper arm 175 has an arm extension 179 that carries a cam follower wheel 181 at its distal end. It will be seen that upward movement of the cam follower wheel 181 and the arm extension 179 causes the stripper plates 173B and 175B to move away from each other to an open configuration. The cam follower wheel 181 is positioned to engage perimeter cam track sections 183, 185 (FIG. 1) that extend about the rotating cage 155 as the cage moves around the cam drum. The cam track sections 183, 185 are stationary with respect to the rotating cage 155. A first one of the cam track sections 183 is positioned and configured to move the cam follower wheel 181 upwardly to urge the stripper plates 173B, 175B to the open position. The cam track 159 then moves the stripper unit upwardly until the open stripper plates 173B, 175B are positioned on either side of a thigh hanging from the bone holder 17 above.

With the stripper plates so positioned, the downstream end of cam track section 183 allows the arm extension 179 to move downwardly, which closes the stripper plates around the bone of the poultry thigh. The cam track 159 of the stationary cam drum 157 then moves the meat stripper unit 165, with the stripper plates 173B, 175B closed around the bone shaft, in a vertically downward direction, by means of the roller 171. During this downward movement and the meat stripper's progress around the second carousel, the meat is progressively stripped from the thigh bone. The other one of the cam track sections 185 will then engage the cam follower roller 181 with an upwardly directed hump 185A and thereby slightly open the stripper plates 173B, 175B allowing them to pass over the lower knuckle of the thigh bone. The continued downward movement of the meat stripper unit 165 substantially completely removes the meat from the thigh bone.

In many instances, the lump of meat stripped from the thigh bone becomes lodged in or on the stripper plates 173B, 175B such that the thigh meat does not fall of its own accord from the meat stripper unit under the influence of gravity, even when the stripper plates are opened. As mentioned above, this is a particular problem in locations such as the United States where chickens and their thighs tend to be larger and meatier than in some other countries. Reference will now be made to FIGS. 3-9, which show an exemplary embodiment of the present invention that ensures that meat lodged in or on the meat stripper plates is dropped into collection location below after haven been stripped from the bone.

Figure 3:
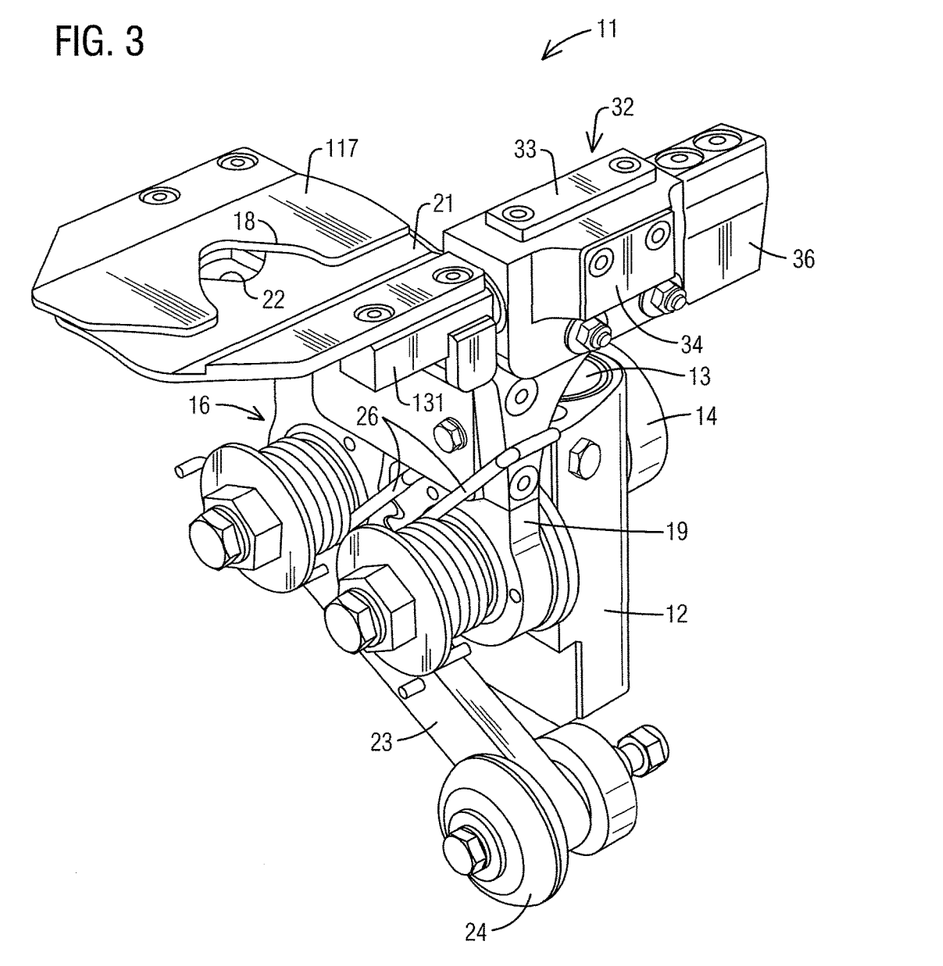
FIG. 3 is a perspective view of an improved meat stripper that incorporates an articulating stripper plate assembly according to principles of the invention with the articulating stripper plate shown in its raised or stripping position.

FIG. 3 illustrates an improved meat stripper for use with a stripping and discharge station such as station 29 of FIG.

1. Many of the components of the meat stripper are similar to those of FIG. 2, and thus will only be described generally here. The meat stripper 11 generally comprises a slide block 12 having cylindrical slide channels 13 for accommodating a pair of slide bars 161 (FIG. 1). Mounted to the back of the slide block 12 is a cam follower in the form of roller 14 that, in use, engages within the cam track 159 of the stationary cam drum 157 (FIG. 1). As in FIG. 2, the meat stripper 11 includes a first pivotable gripper arm 16, a second pivotable gripper arm 19, stripper plates 117 and 21, an extension arm 23, and a cam follower 24. Also as in FIG. 2, upward movement of the extension arm 23 causes the stripper plates and their respective recesses 18 and 22 to move away from each other to open the meat stripper. The stripper plates 117 and 21 are yieldably urged toward the closed centered position in this embodiment by coil springs 26 or by another suitable biasing arrangement. The meat stripper 11 functions to strip meat from a bone in a manner similar to that of the meat stripper of FIG. 2.

Figure 2:
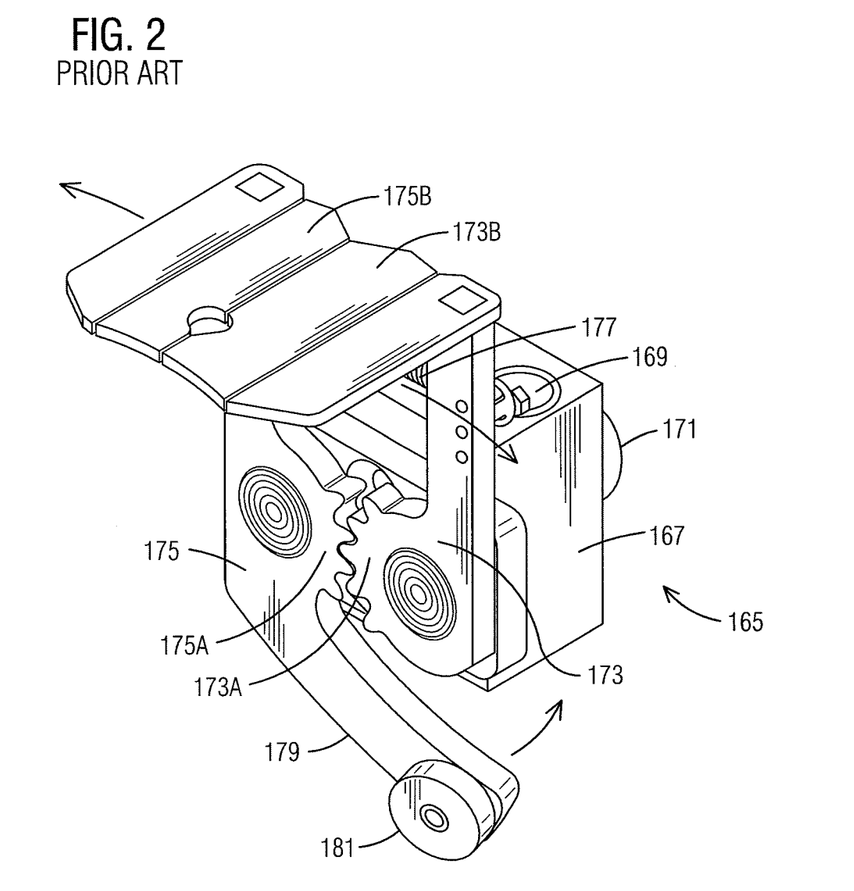
FIG. 2 is a perspective view of a prior art meat stripper for use in the meat stripping and discharge section of FIG. 1

The meat stripper of FIG. 3 differs from that of FIG. 2 in that the second stripper plate 21 can be articulated downwardly to dislodge and drop a lump of meat that may be lodged in or on the stripper plates after having been stripped from a bone. To accomplish this, a pivot block 32 is fixed to the upper end of the second gripper arm 19. A pivot shaft 30 (FIG. 9) is rotatably journaled in and extends through the pivot block 32. A first end 131 of the pivot shaft projects from the pivot block 32 and is shaped such that the second stripper plate 21 can be mounted to the end 131 with screws. A second opposite end of the pivot shaft 30 projects from the opposite end of the pivot block 132 and is configured to receive a cam leaver 36, which also can be secured to the end of the pivot shaft with screws.

With this arrangement, it will be seen that pivotal movement of the cam leaver 36 causes the pivot shaft 30 to rotate within the pivot block 32, which, in turn, results in pivotal movement of the second stripper plate 21. FIG. 3 shows the second stripper plate 21 pivoted upwardly to a first or stripping position. The pivot block 32 incorporates a biasing mechanism (detailed below), covered by plates 33 and 34, and the biasing mechanism yieldably biases the second pivot plate 21 to its first or stripping position.

Figure 4:
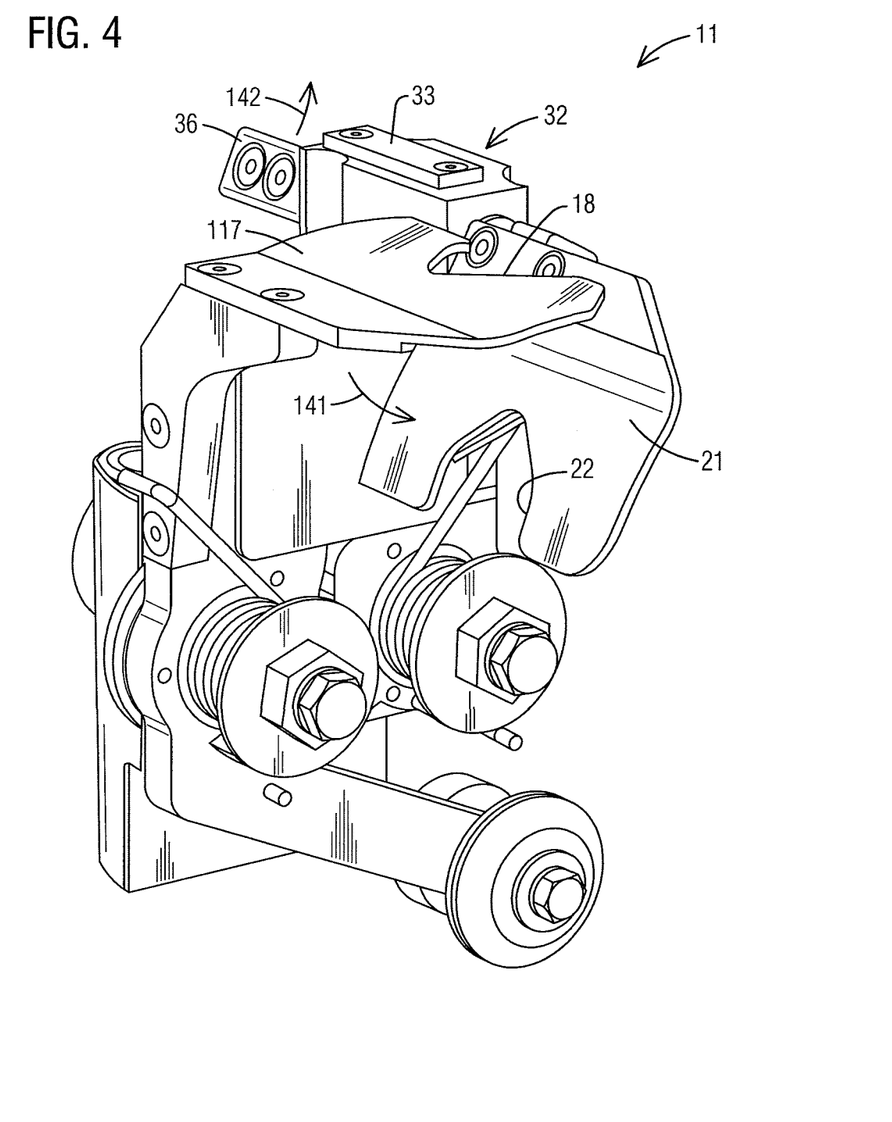
FIG. 4 is a perspective view of the meat stripper of FIG. 3 showing the articulating stripper plate in its lowered or dislodging position.
Figure 5:
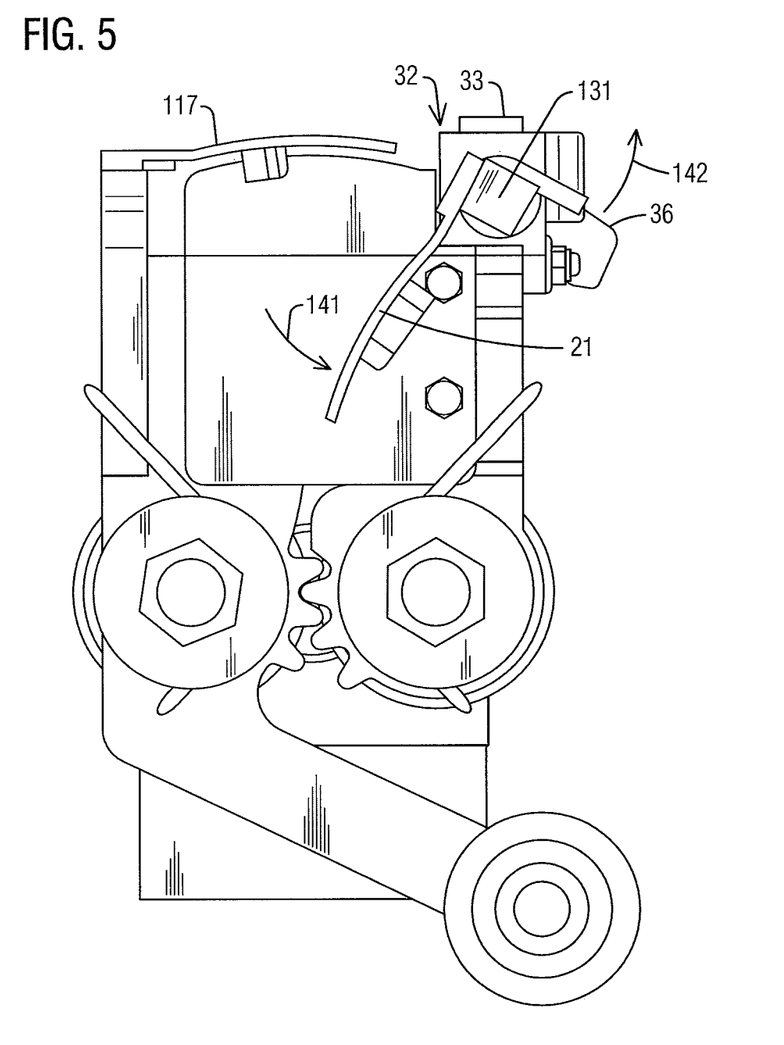
FIG. 5 is a side plan view of the meat stripper of FIG. 4

FIG. 4 shows the meat stripper 11 from a different perspective and illustrates the second pivot plate 21 pivoted downwardly, as indicated by arrow 141, to its second or dislodging position. The second pivot plate 21 is moved from its first position to its second position by a corresponding upward pivoting motion of the cam leaver 36, as indicated by arrow 142. In operation, when it is desired to pivot the second stripper plate 21 to its second position, the cam leaver 36 engages a cam surface strategically located and configured on the stationary cam drum 157 (FIG. 1). The cam surface pivots the cam lever 36 upwardly, which pivots the second cam plate 21 downwardly to dislodge and drop stripped meat that may have become lodged in or on the stripper plates. In one embodiment, this action is carried out immediately after the meat has been stripped from its bone and dislodged lumps of meat simply drop under the influence of gravity to a collection location below. FIG. 5 is a side elevation of the meat stripper shown in FIG. 4 illustrating from another angle the downward pivoting motion 141 of the second stripper plate 21 to its dislodging position as a result of the upward pivoting motion 142 of the cam leaver 36.

Figure 6:
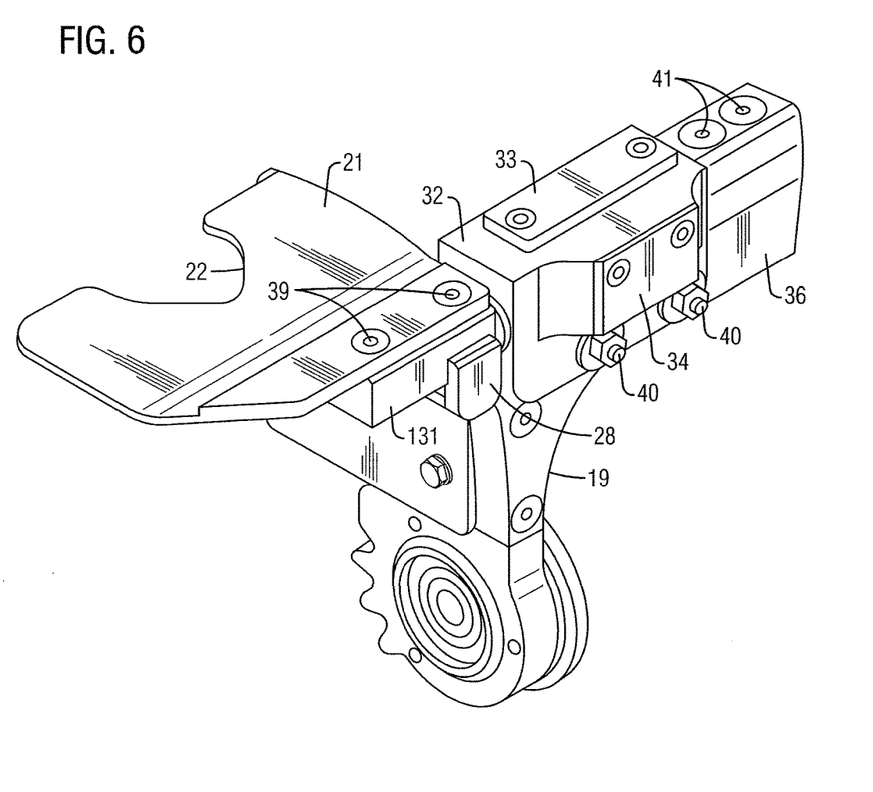
FIG. 6 is a perspective view showing one embodiment of an articulating stripper plate assembly for a meat stripper according to principles of the invention.

FIG. 6 shows the articulating stripper plate assembly of this invention removed from the meat stripper for clarity. It can be seen perhaps better here that the pivot block 32 is mounted to the upper end of the gripper arm 19 by means of fasteners 40, the second stripper plate 21 is secured to the protruding end 131 of the pivot shaft 30 with screws 39, and the cam leaver 36 is secured to the opposite protruding end of the pivot shaft 30 by screws 41. Cover plates 33 and 34 are secured to the pivot block 32 by respective sets of screws to cover and seal components of the biasing mechanism that biases the stripper plate 21 to its first or stripping position. A stop 28 projects downwardly from the protruding end 131 of the pivot shaft and is positioned to engage a surface of the gripper arm 19 (not visible) to prevent the pivot plate 21 from pivoting upwardly under the influence of the biasing mechanism past its first or stripping position.

Figure 7:
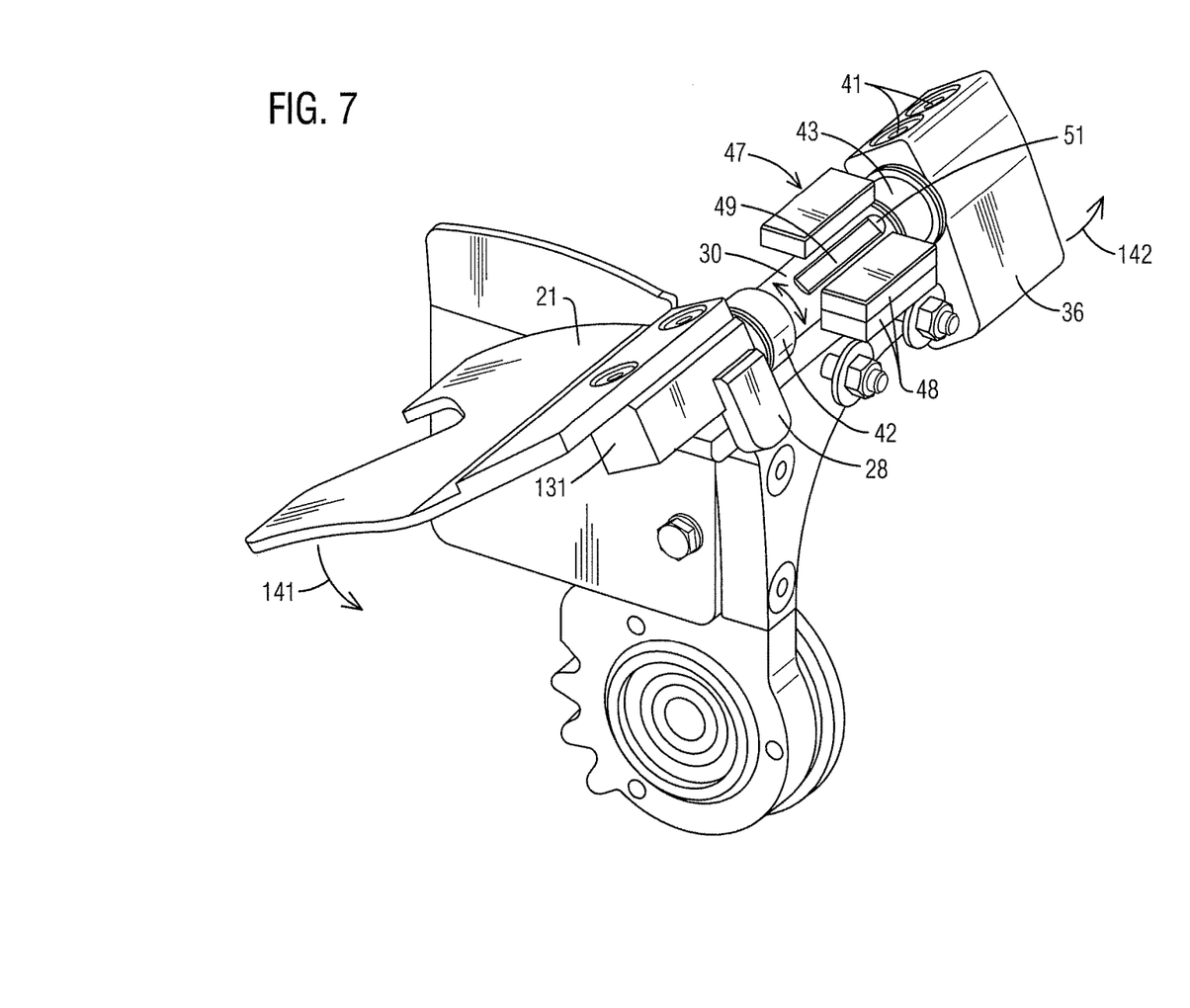
FIG. 7 is a perspective view of the articulating stripper plate assembly with the pivot block removed showing a preferred positioning of biasing magnets within the pivot block and pivot shaft.

A preferred embodiment of the biasing mechanism will now be described in detail with reference to FIGS. 7-9. FIG. 7 is a perspective view showing the articulating stripper plate assembly with the pivot block 32 rendered transparent to show the biasing mechanism. The pivot shaft 30 extends through the pivot block 32 (not visible in FIG. 7) and is rotatably journaled in bushings 42 and 43 in the ends of the pivot block. The bushings allow the pivot shaft 30 to rotate back and forth in the direction indicated by the arrow adjacent the pivot shaft in FIG. 7. An elongated slot 51 is milled in the pivot shaft 30 between the bushings 42 and 43 and a permanent magnet 49 is disposed in the slot 51. A top permanent magnet 47 is contained in a pocket of the pivot block and is located above the pivot shaft 30. A pair of side magnets 48 is contained in another pocket of the pivot block and these magnets are located to the side of the pivot shaft 30.

As detailed below, the poles of the magnets 47, 48, and 49 are oriented in such a way that the magnets generate magnetic fields that oppose counterclockwise rotation of the pivot shaft and support clockwise rotation of the pivot shaft. The result is that the pivot shaft is magnetically biased toward a clockwise rotational orientation. In this orientation, the stripper plate 21 is raised upwardly to its stripping position established by the stop 28. Movement of the cam lever 36 in the direction indicated by arrow 142 causes the pivot shaft to rotate in a counterclockwise direction against the opposing bias of the magnetic fields, which, in turn, pivots the stripper plate 21 downwardly to its dislodge position as indicated by arrow 141. When the cam lever 36 is released, the stripper plate snaps back up to its stripping position as a result of the opposing and supporting magnetic biases established by permanent magnets 47, 48, and 49. In this regard, the stripper plate 21 functions as if it were biased to its stripping position by a spring or other traditional biasing mechanism. However, unlike springs, magnets are perpetually clean because they are contained and sealed within the pivot block, they never malfunction or need replacing, and they last virtually forever.

Figure 8:
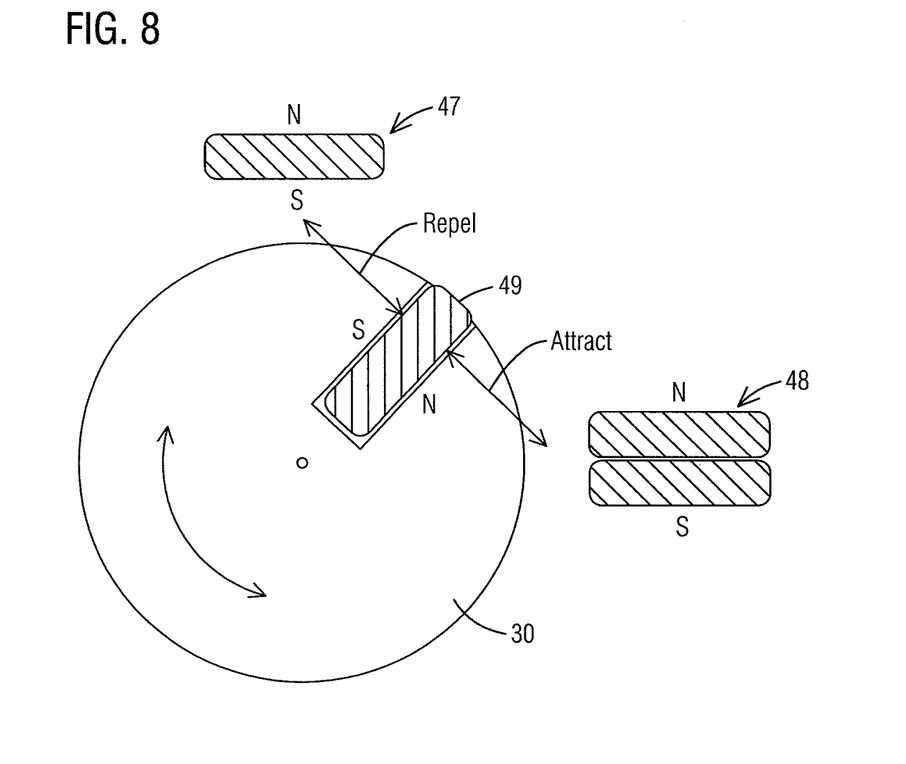
FIG. 8 is a cross sectional view through the pivot shaft and biasing magnets of FIG. 7 illustrating one possible orientation of the magnets to provide the desired biasing force.

FIG. 8 illustrates one possible arrangement of the permanent magnets 47, 48, and 49 for obtaining the desired magnetic biasing forces. In this arrangement the top magnet 47 is oriented with its south pole facing downwardly and the side magnets 48 are oriented so that their combined south pole also faced downwardly. The pivot shaft magnet 49 is oriented with its north and south poles facing in the directions shown. With such an arrangement, counterclockwise rotation of the pivot shaft 30 is opposed both by the attraction of the north pole of the pivot shaft magnet 49 to the south pole of the side magnets 48 and the repulsion of the south pole of the pivot shaft magnet by the south pole of the top magnet 47. Of course, the arrangement shown in FIG. 8 is exemplary only and those skilled in the art may select other arrangements so long as the end result is that the pivot shaft and stripper plate are yieldably biased to the stripping position of the stripper plate by the interaction of magnetic forces.

Figure 9:
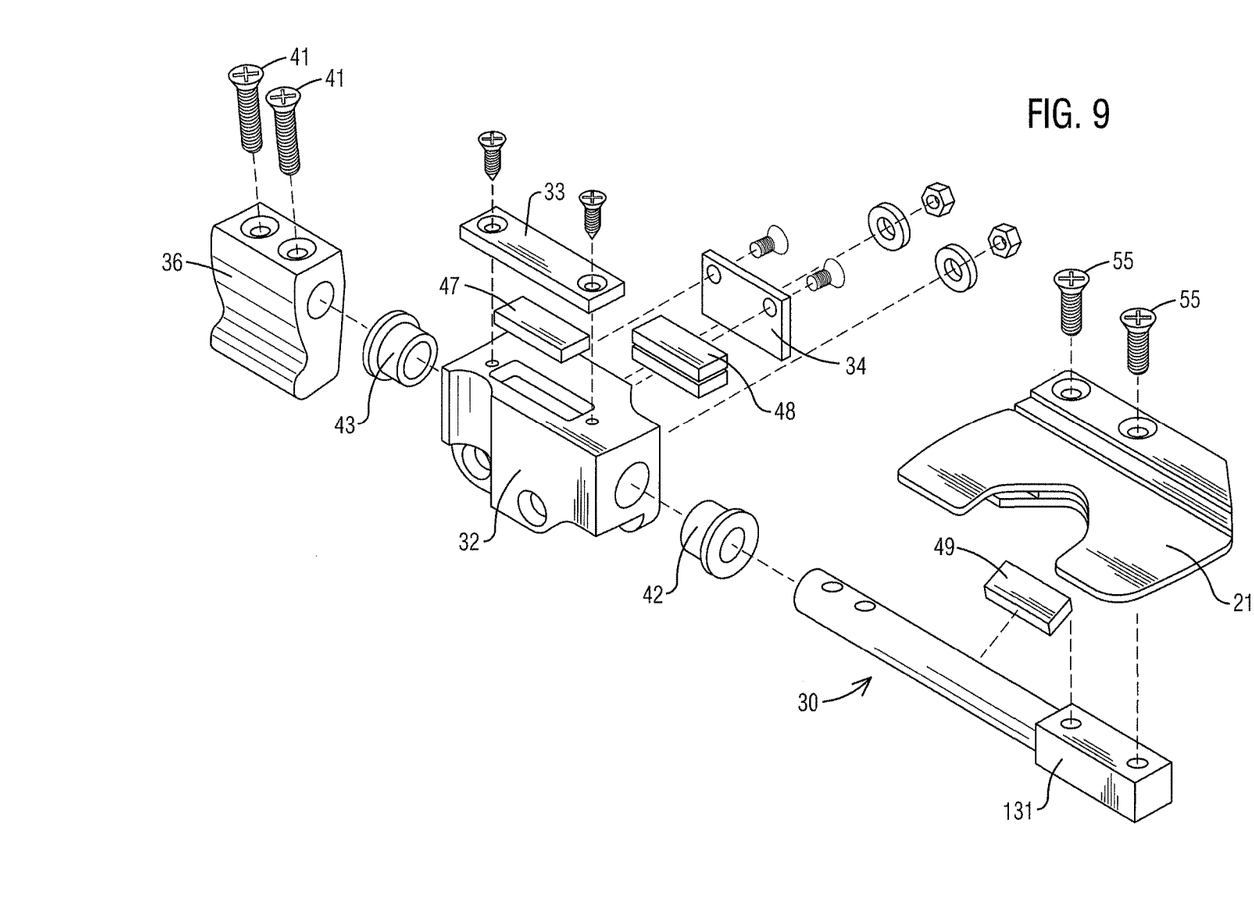
FIG. 9 is an exploded perspective view of the articulating stripper plate assembly of FIG. 6 illustrating various components thereof.

FIG. 9 is an exploded perspective view of the articulating stripper plate assembly illustrating better the interrelations of the various parts of the assembly. It is clear from this figure that the pivot shaft 30 extends through the pivot block 32 and is rotatably journaled in bushings 42 and 43 in the ends of the pivot block. The cam lever 36 is secured on one protruding end of the pivot shaft with screws 41 and the stripper plate 21 is secured on the opposite protruding end of the pivot shaft with screws 55. Top magnet 47 is contained within a pocket in the top of the pivot block and is covered and sealed therein by a cover plate 33. Side magnets 48 are similarly contained within a pocket (not visible) in the side of the pivot block and are covered and sealed therein by a cover plate 34. Pivot shaft magnet 49 is contained within a slot 51 (FIG. 7) of the pivot shaft and may be secured therein with a friction fit or adhesive, for example.

The invention has been described herein in terms of preferred embodiments and methodologies considered by the inventors to represent the best modes of carrying out the invention. However, these preferred embodiments are exemplary only and a wide range of equivalent modifications and substitutions might well be made by the skilled artisan to obtain the same result. For example, while magnets are preferred for creating the biasing force, other mechanisms may be selected such as compression springs, extension springs, coil springs, and the like. While the preferred form of articulation of the stripper plate is pivotal movement, other motions might also be implemented so long as the function of dumping lodged pieces of meat from the stripper is obtained. These and other additions, deletions, and modifications, both subtle and gross, might well be made without departing from the spirit and scope of the invention as set forth in the claims.

What is claimed is:

1. An apparatus for separating and collecting meat from animal parts, each animal part having meat surrounding a bone with a first knuckle at one end and a second knuckle at an opposite end, the apparatus comprising:
    a conveyor defining and moving along a processing path;
    a plurality of bone holders coupled to the conveyor in spaced relationship and movable with the conveyor along the processing path, each bone holder being configured to hold the bone of an animal part from the first knuckle to suspend the animal part from the bone holder;
    a meat stripper station disposed along the processing path and comprising at least one meat stripper having a first stripper plate and a second stripper plate movable toward and away from one another, the at least one meat stripper being moved synchronously along the processing path below one of the plurality of bone holders;
    a mechanism for moving the first and second stripper plates together to engage and substantially surround a bone held by one of the plurality of bone holders at a location adjacent the bone holder;
    a mechanism for moving the meat stripper and the bone holder progressively away from one another to strip the meat from the bone in a direction toward the second knuckle, the mechanism further moving the meat stripper over the second knuckle to separate the meat from the bone;
    a mechanism for articulating at least one of the stripper plates in such a way that meat lodged in or on the meat stripper is dislodged and dropped from the meat stripper; and
    a collection station for collecting the meat separated from the bone.

2. An apparatus for separating and collecting meat from animal parts as claimed in claim 1 wherein the mechanism for articulating at least one of the stripper plates comprises a mechanism for pivoting at least one of the stripper plates.

3. An apparatus for separating and collecting meat from animal parts as claimed in claim 2 wherein the stripper plate is pivotable between a stripping position for stripping meat from a bone and a dislodging position for dislodging meat from the stripper plates after the meat has been stripped from the bone.

4. An apparatus for separating and collecting meat from animal parts as claimed in claim 3 further comprising a biasing mechanism configured to bias the stripper plate yieldably to its stripping position.

5. An apparatus for separating and collecting meat from animal parts as claimed in claim 4 wherein the biasing mechanism comprises permanent magnets.

6. An apparatus for separating and collecting meat from animal parts as claimed in claim 1 wherein the mechanism for moving the first and second stripper plates together comprises a cam follower on the meat stripper and a stationary cam track associated with the stripper station, the cam follower engaging the cam track as the meat stripper moves through the meat stripping station.

7. An apparatus for separating and collecting meat from animal parts as claimed in claim 1 wherein the mechanism for moving the meat stripper and the bone holder progressively away from one another comprises a cam follower on the stripper and a stationary cam track associated with the stripper station, the cam track being configured to move the meat stripper away from the bone holder as the meat stripper moves through the meat stripping station.

8. A meat stripper for stripping meat from the bone of an animal part, the meat stripper comprising:
    a slide block;
    a first stripper plate assembly including an arm pivotally mounted to the slide block and having a first stripper plate at an opposite end;
    a second stripper plate assembly including an arm pivotally mounted to the slide block and having a second stripper plate at an opposite end;
    the first and second stripper plates moving away from each other to an open configuration when the arms are pivoted apart and moving toward each other to a closed configuration to surround the bone when the arms are pivoted together;
    a mechanism for moving the stripper plates when in their closed configuration along the length of the bone to strip meat from the bone; and
    a mechanism for articulating at least one of the stripper plates after meat has been stripped from the bone in such a way that meat lodged in or on the stripper is dislodged and falls to a collection location below.

9. A meat stripper as claimed in claim 8 wherein the mechanism for articulating articulates the at least one stripper plate between a stripping position for stripping meat from a bone and a dislodging position for dislodging meat from the stripper.

10. A meat stripper as claimed in claim 9 further comprising a biasing feature configured to bias the at least one stripper plate yieldably to its stripping position.

11. A meat stripper as claimed in claim 10 wherein the biasing feature comprises permanent magnets arranged to oppose movement of the stripper plate toward its dislodging position and to urge movement of the stripper plate toward its stripping position.

12. A meat stripper as claimed in claim 11 further comprising a pivot shaft rotatably mounted in a pivot block and carrying the pivot plate on a protruding end, the permanent magnets being located in the pivot shaft and in the pivot block.

13. A meat stripper as claimed in claim 12 further comprising a cam lever mounted to an opposite protruding end of the pivot shaft, the cam lever being configured and positioned to engage a cam surface for articulating the at least one pivot plate.

14. A method of stripping meat from the bone of a slaughtered animal comprising the steps of:
   (a) gripping the bone at one end with a bone holder;
   (b) substantially surrounding the bone adjacent the bone holder between two opposed stripper plates;
   (c) moving the stripper plates and the bone holder away from one another to strip the meat progressively from the bone; and
   (d) articulating one of the stripper plates to dislodge the meat from the stripper plates.

15. The method of claim 14 wherein step (d) comprises pivoting one of the stripper plates.

16. The method of claim 14 further comprising the step of yieldably biasing the stripper plate to be articulated to a stripping position relative to the other stripper plate.

17. The method of claim 16 wherein the step of yieldably biasing comprising establishing magnetic fields that interact to urge the stripper plate to be articulated toward its stripping position.

18. The method of claim 17 wherein step (d) comprises rotating a pivot shaft to which the stripper plate to be articulated is attached.

19. The method of claim 18 wherein the step of establishing magnetic fields comprises disposing a permanent magnet in the pivot shaft.

20. The method of claim 19 wherein the pivot shaft is rotatably journaled within a pivot block and wherein the step of establishing magnetic fields comprises disposing at least one permanent magnet in the pivot block.

21. The method of claim 20 wherein the step of establishing magnetic fields comprises disposing at least two permanent magnets in the pivot block, one of the permanent magnets in the pivot block arranged to attract the permanent magnet in the pivot shaft and the other one of the permanent magnets in the pivot block arranged to repel the permanent magnet in the pivot shaft.

* * * * *